United States Patent [19]

Crisler et al.

[11] Patent Number: 5,193,091

[45] Date of Patent: Mar. 9, 1993

[54] TDM COMMUNICATION SYSTEM FOR A WIDE AREA SITE AND A PLURALITY OF LOCAL SITES

[75] Inventors: Kenneth J. Crisler, Wheaton; Bradley M. Hiben, Glen Ellyn, both of Ill.; Anthony Van den Heuvel, Surry, United Kingdom

[73] Assignee: Motorola, Inc., Schaumburg, Ill.

[21] Appl. No.: 626,519

[22] Filed: Dec. 12, 1990

[51] Int. Cl.⁵ ............................................. H04Q 7/04
[52] U.S. Cl. ..................................... 370/95.1; 379/59; 379/60; 455/33.1
[58] Field of Search ............... 370/95.1, 95.7, 80, 370/99, 97, 45.3; 379/59, 60, 61, 62, 56, 58; 340/825.44; 455/33, 34, 32.1, 33.3, 33.4, 53.1, 54.1, 56.1, 11.1, 15, 52.3, 54.1, 33.2; 375/13; 358/147

[56] References Cited

U.S. PATENT DOCUMENTS

| | | |
|---|---|---|
| 3,693,088 | 9/1972 | Rustako, Jr. et al. .............. 455/52.3 |
| 3,898,390 | 8/1975 | Wells et al. ............................ 379/59 |
| 3,906,166 | 9/1975 | Cooper et al. ........................ 379/60 |
| 4,063,290 | 12/1977 | Metildi et al. ....................... 358/147 |
| 4,138,596 | 2/1979 | Roche ................................... 370/84 |
| 4,530,093 | 7/1985 | Akran e al. ......................... 370/85.7 |
| 4,556,760 | 12/1985 | Goldman ............................... 379/60 |
| 4,696,027 | 9/1987 | Bonta ..................................... 379/60 |
| 4,816,820 | 3/1989 | Davis .................................... 370/84 |
| 4,852,089 | 7/1989 | Berry et al. ........................ 370/95.1 |
| 4,870,408 | 9/1989 | Zdunek et al. ..................... 370/95.1 |
| 4,879,740 | 11/1989 | Nagashima et al. .................. 455/33 |
| 4,914,649 | 4/1990 | Schwendeman et al. ............ 455/34 |
| 4,965,798 | 10/1990 | Mostafa et al. ....................... 370/79 |

Primary Examiner—Douglas W. Olms
Assistant Examiner—Dang Ton
Attorney, Agent, or Firm—Robert S. Babayi

[57] ABSTRACT

A time division multiplexed system is disclosed in which communication messages among a wide area site and a plurality of substantially scattered local sites are communicated on a radio frequency channel which is divided into a plurality of time slots, wherein at least one of the time slots is further divided into a plurality of subslots. Communication units operating in the wide area site communicate communication messages during the time slots, and the communication units operating in the local sites communicate communication messages during the subslots which are assigned to each of the local sites.

13 Claims, 9 Drawing Sheets

TDM COMMUNICATION SYSTEM FOR A WIDE AREA SITE AND A PLURALITY OF LOCAL SITES

TECHNICAL FIELD

This invention relates generally to TDM communication systems and in particular to a TDM communication system which allows communication among communication units operating in a wide area site and a plurality of local sites.

BACKGROUND

A wide area communication system is generally referred to as a communication system which provides coverage for communication units travelling in a substantially large area, such as a metropolitan area and neighboring suburbs. In a wide area communication system, the communication units usually comprise substantially high power mobile two-way radios which are installed in a vehicle and communicate with each other via wide area repeaters which include substantially high power transmitters to provide the necessary communication coverage.

An on site communication system generally refers to a communication system which provides communication coverage for portable communication units confined to substantially smaller local sites, such as a building. The communication units in an on site communication system usually comprise small and substantially low power portable radios generally having an output power range between 30 to 100 mWatt which provide prolonged battery life.

It is desired to extend the communication coverage of the low power portable communication units operating within a plurality of on site communication systems and to provide full duplex communication capability with the high power mobile communication units operating in the wide area communication system. However, the low power output of the portable communication units may inhibit communication of messages with the wide area repeater. That is, communication messages transmitted from the portable communication unit may not reach the wide area repeater due to a communication unit's significantly lower transmitter output power. It is also typical for an on site communications system to utilize a different communications protocol than that of a wide area communications system, rendering the on site communication units incompatible with use in the wide area system. Hence, a communications user of the prior art desiring communications in both an on site area and a wide area is required to carry at least two communication units. This invention addressees the problem of integration of wide area and on site communication systems, thereby making it possible for a single portable communication unit of acceptable complexity to be used for all communication needs.

The communication in both wide area and on site communication systems makes use of radio frequency (RF) communication channels for communicating the communication messages. Radio frequency (RF) communication systems that make use of time division multiplexing (TDM) are known. In such systems a communication frequency (or frequencies) is divided by time into frames and time slots, and a plurality of communication units are assigned time slots to support their communication needs. The communication units communicate their messages at their respective assigned time slots through a number of repeaters in conjunction with one central communication controller. In order to facilitate the channel assignment mechanism, such systems generally provide one or more dedicated control time slots that support the channel assignment and other control functions. An important advantage of a TDM radio communication system is the capability of providing full duplex communication between two communication units on a single RF communication channel.

SUMMARY OF THE INVENTION

Briefly, according to the invention, a TDM communication system is provided for communicating communication messages among a plurality of communication units operating in a wide area site and communication units operating in a plurality of local sites. The communication messages within the system are communicated on at least one radio frequency channel which is divided into at least one time slot and a plurality of subslots, the subslots having a substantially shorter duration than the time slot. Each local site is assigned to at least one subslots during which local site communication control messages are communicated. The communication system includes a main site communication means for communicating communication messages to the wide area communication units and to a plurality of local site communication means during the time slot. The local site communication means are located in each local site and communicate with the local site communication units during at least one of the subslots.

DETAILED DESCRIPTION OF THE PREFERRED EMBODIMENT

Figure 1:
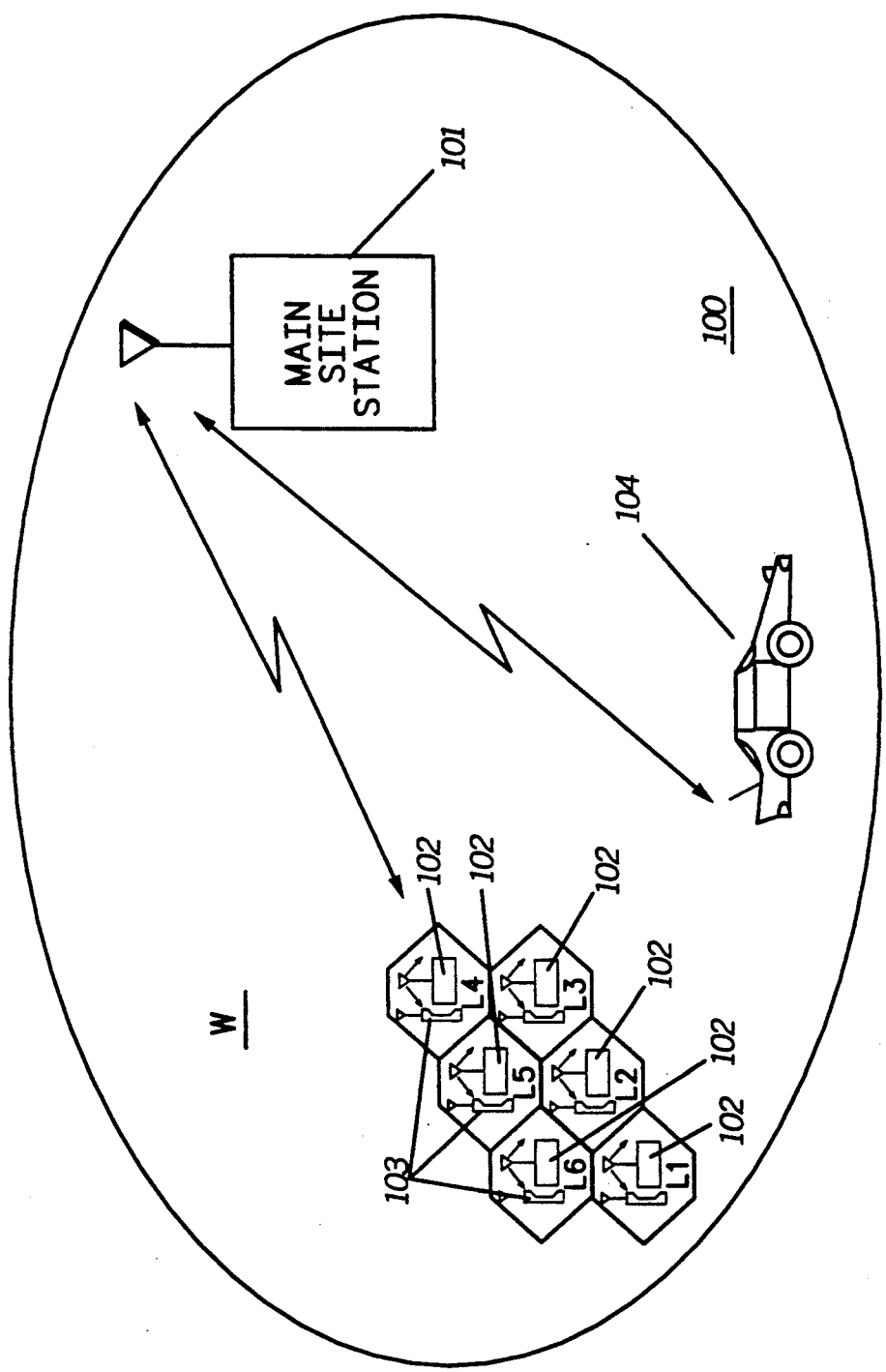
FIG. 1 depicts a time division multiplexed communication system utilizing the principals of the present invention.

Referring to FIG. 1, a time division multiplexed (TDM) communication system incorporating the principles of the present invention can be seen as generally depicted by the numeral 100. The communication system 100 provides communication coverage for a substantially wide area site, such as a metropolitan area, as well as a plurality of substantially smaller local sites, such as buildings and/or manufacturing or hospital sites. As will be explained later, there is benefit in dividing the plurality of local sites into a plurality of local site groups. In the preferred embodiment, the number of local sites in a local site group is six. One such local site group, L1-L6, is shown in FIG. 1. Generally, the communication coverage comprises providing voice and control data communication capability among local site communication units 103 and wide area site communication units 104. As described herein, the local site communication units 103 generally refer to low power portable radios (i.e., portable radios having 30 to 100 mW) which are operated within the local sites L1-L6, and the wide area site communication units 104 generally refer to high power mobile radios which travel through and operate in the wide area site W. The system 100 includes a main site station 101 and a plurality of local site stations 102 for providing communication capability between the communication units 103 and 104. The main site station is located in the wide area site W and the local site stations 102 are located in the local sites L1-L6. The communication messages within the communication system are communicated through RF communication channels.

The communication messages within the system 100 comprise inbound and outbound voice and control messages which are respectively communicated on voice and control channels. As is well known in a TDM communication system, the RF communication channels, i.e., RF voice and control channels, are divided into a plurality of time slots during which the main site station 101, the local site stations 102, and the communication units 103 and 104 may communicate voice and control messages. The inbound and outbound control messages may comprise such messages as communication request, communication grant, and other messages which facilitate orderly communication within the system 100. The voice messages comprise the conversational messages communicated between the users of the local site communication units 103 and wide area site communication units 104. The local site communication units 103 communicate voice and control messages with the main site station 101 through the local site station 102 while the wide area communication units 104 communicate voice and control messages with the main site station directly. Accordingly, the main site station 101 provides the means through which communication messages between communication units 103 and 104 are communicated.

The local site stations 102 communicate voice and control messages with the portable communication units 104 in each local site L1-L6 via a combination of an RF channel and a time slot or sub slot which is unique to that local site within the local site group L1-L6. However, as is well known in the art, due to low power capability of the portable communication units, the RF channels and TDM slots used in local sites L1-L6 may be reused in other local site groups when the local site groups are geographically separated from each other by a sufficient distance. The arrangement of RF channels and TDM slots in the local site groups thus define a geographic frequency and time slot reuse pattern. However, in the preferred embodiment of the invention, the voice and control messages between the main site and the local sites are communicated on a set of RF communication channels and time slots which are unique to the entire system and may not be geographically reused.

In the preferred embodiment, there is also a limited set of RF communication channels which are available for use in the entire system. The available channels are apportioned between wide area usage and local area usage according to the relative requirements for wide area and local area communications. Those skilled in the art will appreciate that this apportionment may be statically determined when the system is established or may be dynamically altered in response to varying requirements by an appropriate channel control element. In the preferred embodiment, this channel control element resides at the main site and control functions are implemented using control message communications between the main site and the local sites. Note that this also enables the channel controller to control the specific nature of the geographical reuse of local site channels.

Figure 2:
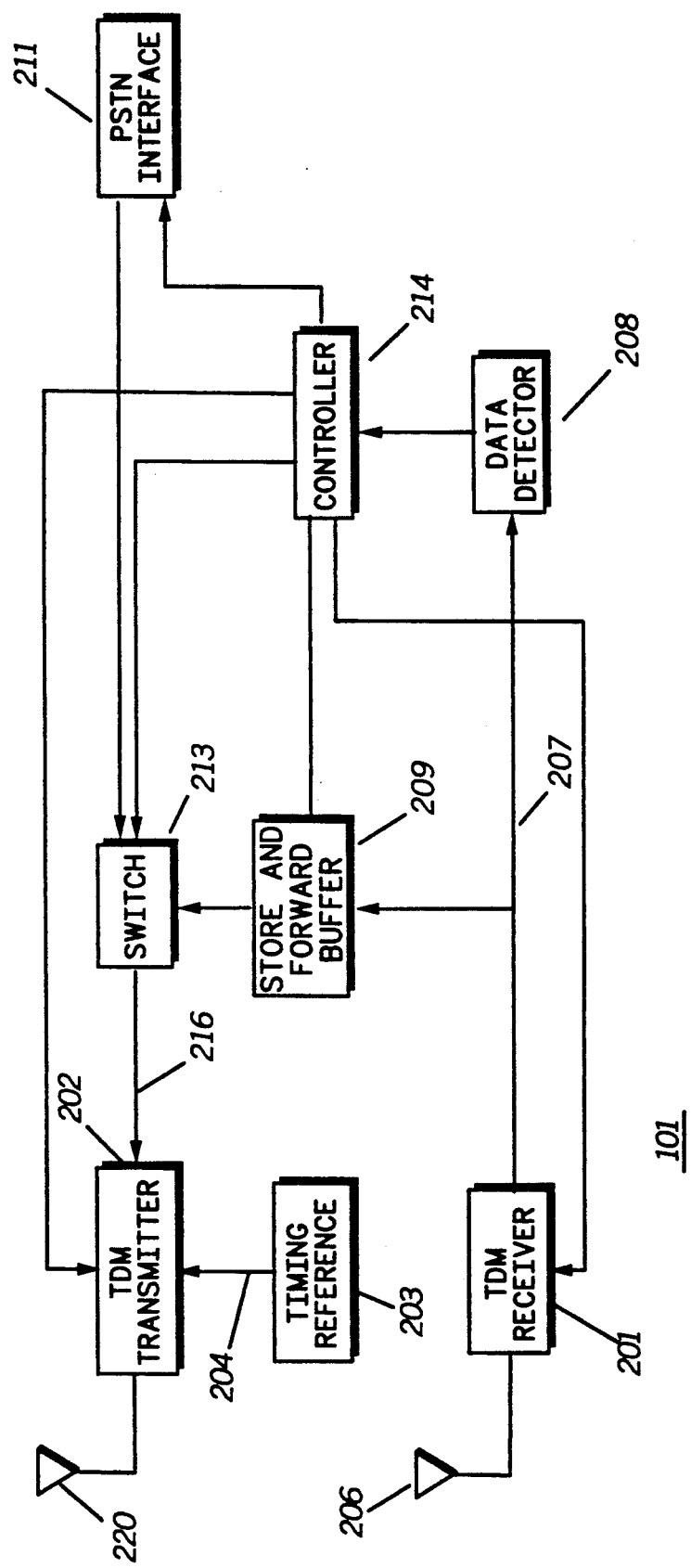
FIG. 2 is a block diagram of the main site station of the communication system of FIG. 1.

Referring to FIG. 2, the main site station 101 is shown to include a central controller 214 which controls the overall operation of the system 100. The controller 214 also controls the operation of a TDM receiver 201 and a TDM transmitter 202 including their operational frequency. A timing reference generator 203 provides a synchronization signal 204 so as to maintain time synchronization among the the main site station 101, local site stations 102, and the communications units 103 and 104. The TDM receiver 201 under the control of the central controller 214 receives communication signals on an appropriate frequency via an antenna 206. The TDM receiver operates in a known manner to recover any voice or control messages included in the received communication signal, thus providing the RX data 207. The control messages are detected by a well known data detector 208 and are applied to the central controller 214. The recovered voice messages may be a processed version of the original audio signal (for example, voice processed via Sub-Band Coding or Linear Predictive Coding) which may be applied to a store and forward buffer 209. The voice messages stored in the buffer 209 under the control of the central controller 214 may be forwarded to the transmitter 203 for retransmission on a subsequent TDM time slot. The transmitter 203 receives a TX data 216 either from the buffer 209 or the central controller 214 via a switch 213. The TX data 216 may comprise the voice messages from the receiver section 201 and/or control messages from the central controller 214. The transmitter 203 comprises a well known TDM transmitter which properly processes the signal to provide an RF signal that may be appropriately radiated from an antenna device 220. The transmission of the signals by the TDM transmitter 203 is synchronized via the main synchronization signal 204 provided by the timing reference generator 203. Furthermore, voice and data messages may be initiated via a PSTN interface 211 coupled to the central controller 214, thereby allowing accesses by to the system via telephone lines.

Figure 3:
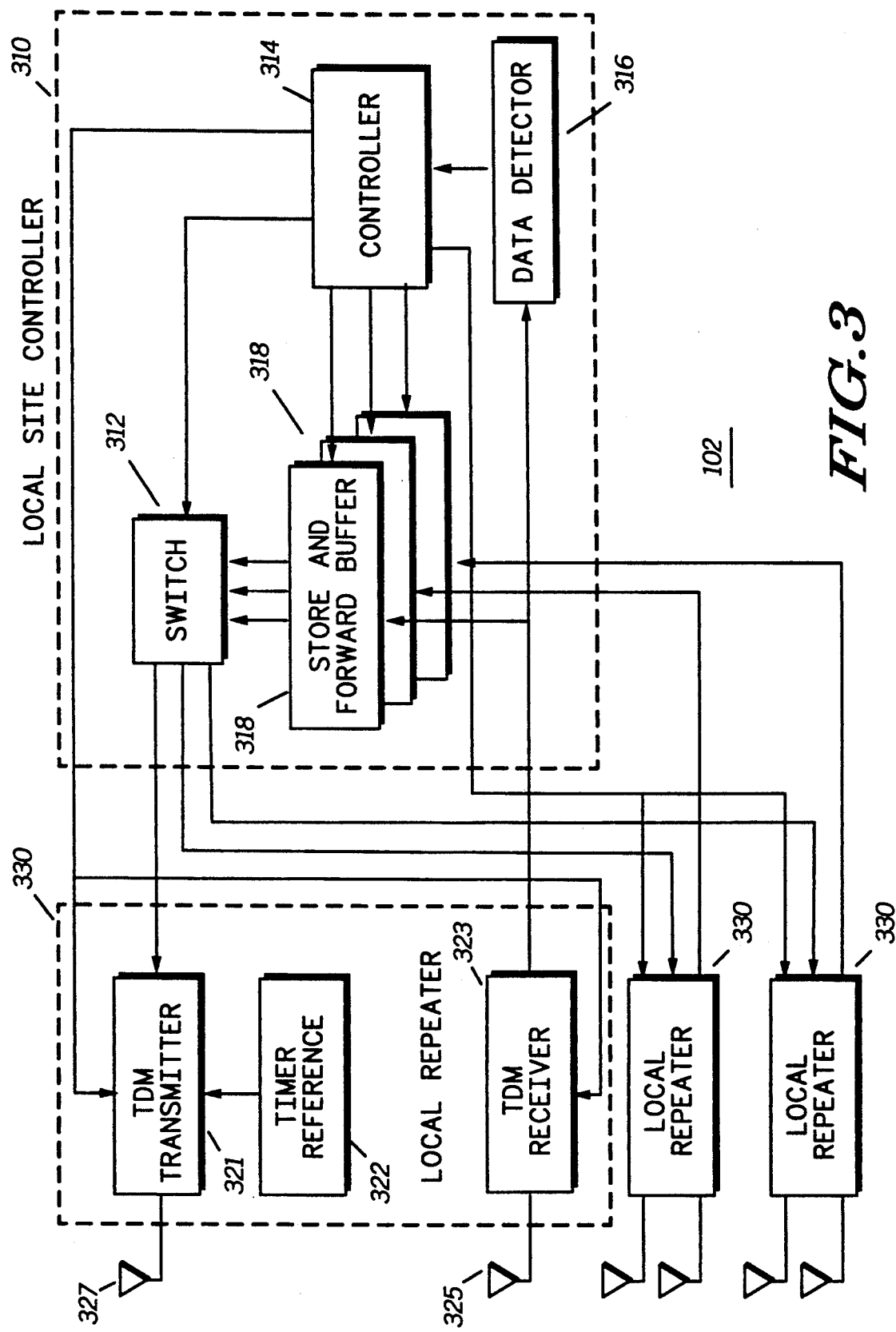
FIG. 3 is a block diagram of a local site station of the communication system of FIG. 1.

Referring to FIG. 3, the block diagram of the local site station 102 is shown. The local site station 102 includes a local site controller 310 and a plurality of TDM local repeaters 330. The local site communication units 103 communicate voice and control messages with the local site controller through the local repeaters 330 which may be co-located with the local site controller 310 or scattered throughout the local site. The voice and control messages between the local site controller 310 and the main site station are communicated via at least one of the local site repeaters 330. In one embodiment of the invention, one or more of the local site repeaters are designated to be used exclusively for communicating communication messages between the local site station and the main site station while the remainder of the local site repeaters are exclusively used for communicating communication messages between the local site station and the local site communication units 103. In another embodiment, each local repeater may communicate with either the local site communication units 103 or the main site station 101 as necessary to effect the desired communications. The local repeaters 330 comprise full duplex repeaters which are coupled to the local site controller via well known wire links, such as conventional telephone lines. The local site repeater 330 includes a TDM receiver 323 that receives the communication signals via an antenna 325 and routes them to the local site controller 310. A TDM transmitter 321 being synchronized by a timing reference 322 receives communication signals from the local site controller 310 and causes them to be radiated on an appropriate RF frequency channel via an antenna 327. The receive and transmit frequencies of the repeaters 330 are controlled by the local site controller 314. The local site controller 310 includes a controller 314 for controlling the overall operation of the local site station 102. The control messages received from the TDM receivers 323 are detected by a well known data detector 316 and are applied to the controller 310. One data detector 316 is included for each local repeater 330. The recovered voice messages, consisting of digital representations of voice signals, may be applied to store and forward buffers 318 while awaiting retransmission, there existing one store and forward buffer for each of the local repeaters 330. Each TDM transmitter 321 receives communication messages for retransmission either from one of the buffers 318 or the controller 314 via a switch 313 the state of which is controlled by the controller 314.

Figure 4:
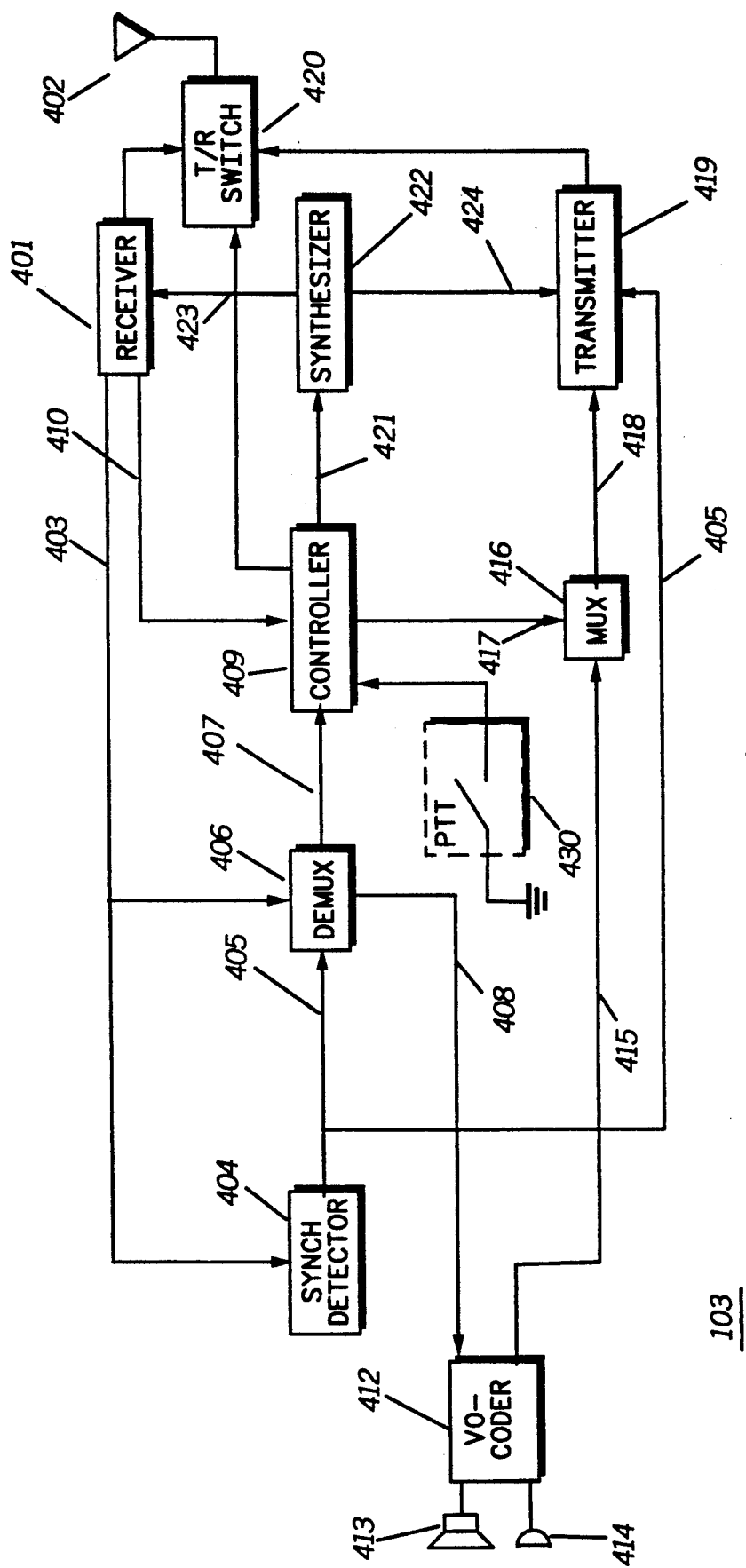
FIG. 4 is a block diagram of a local site communication unit of the communication system of FIG. 1.

Referring to FIG. 4, the block diagram of a local site communication unit 103 is shown to include a TDM receiver 401 that couples to an appropriate antenna 402 via transmit/receive switch 420 to receive RF communication signals and provide an RX signal 403. The communication unit 103 comprises a frequency simplex two-way radio, wherein duplex operation is provided by utilizing time division multiplexing. The received signal 403 is applied to a synchronization detector 404 which provides a synchronization signal 405. The synchronization signal 405 provides the information required to establish frame and bit synchronization. The synchronization signal 405 is applied to a demultiplexer 406 so as to retrieve control data 407 and a RX data 408 embedded within the RX signal 403. The control data 407 is applied to a controller 409. The receiver 401 also provides a signal quality indicator (SQI) 410 which may comprise the received signal strength or any other signal quality indicators, such as bit error rate and/or signal to noise ratio (SNR), to the controller 409. The RX data 408 is applied to a voice coder (vo-coder) 412. The vo-coder 412 provides the required coding/decoding function used in this embodiment to properly encode (or decode) the audio information in a particular form. In the preferred embodiment of the present invention, multilevel, digital sub-band coding comprises the preferred encode/decode format. The vo-coder 412 routes decoded signals to an appropriate speaker 413 to be rendered audible.

A voice call may be initiated by activating a push-to-talk (PTT) button 430. The activation of the PTT button informs the controller 409 the voice call is about to be initiated by the portable communication unit 103. (The voice call is initiated by a series of control channel messages which effect a communication unit request for service and a subsequent channel assignment.) Audio signals to be transmitted are routed from a microphone 414 to the vo-coder 412 for processing. The processed audio information are in the form of digital information TX data 415. The TX data 415 is applied to a multiplexer 416 which appropriately adds other control information 417 to the TX data and provides the TX signal 418. The TX signal 418 is applied to a well known TDM transmitter 419 which is synchronized by the synchronization signal 405. The TDM transmitter utilizes the synchronization signal 405, which is derived from the RX signal 403, to establish a constant timing relationship between the RX signal 403 and the TX signal 418. This timing relationship is specific as a part of a particular communication protocol and thus, would be known to both the communication unit 103 and the local site station 102. Ultimately, the properly coded and slot and frame synchronized information signal are transmitted by the antenna 402 and through the transmit/receive switch 420.

The controller 409 is the heart of the communication device and operates to control the many circuits comprising the portable communication device 103. The controller provides frequency data 421 for programming a synthesizer 422. The synthesizer 422 produces the receiver and transmitter frequency local oscillator signals 423 and 424. Accordingly, the TDM receiver 401 and the TDM transmitter 419 may be used to receive or transmit on a particular frequency under the control of the controller 409. The controller 409 may comprise any well known microcontroller, such as MC68HC11 ™ manufactured by Motorola Inc. Alternatively, the controller may be a part of a digital signal processor, such as DSP 56000 manufactured by Motorola, which also embodies the vo-coder 412.

Referring to FIG. 5a, the system 100 utilizes one or more RF control channels for communicating control messages. An exemplary RF control channel 500 comprises a receive frequency 512 for receiving inbound control messages and a transmit frequency 514 for transmitting the outbound control messages. The RF control channel 500, including the receive and transmit frequencies, is generally divided into repetitive time frames 550 which in the preferred embodiment of the invention have a 240 ms duration. Each frame is subdivided into 4 time slots 510, 520, 530, and 540.

FIG. 5b shows an exemplary frame 500 which according to the invention is divided into 4 time slots 510, 520, 530, and 540 each having a 60 ms duration for communicating 720 bits of data. The time slots 510 and 530 comprise central control time slots during which the control messages between the main site station 101 and the wide area site communication units 104 and the local site stations 102 are communicated. The time slots 520 and 540 are each further divided into three 20 msec local control sub slots 521-523, and 541-543 for communicating control messages between the six local site stations 102 in each local site group and the local site communication units 103. Accordingly, the local control sub slots 521-523, and 541-543 have a substantially shorter duration than the time slots 510 and 530. Each of the local control subslots 521, 522, 523, 541, 542, and 543 are assigned to one of the six local site stations 102 during which the control messages for the corresponding sites are communicated. The central control time slots 510 and 530 and the local control subslots 521-523, and 541-543 may be on a single RF control channel 500. Alternatively, based on specific system requirements any other arrangement utilizing more than one RF communication channel may be available. For example, the central control time slots 510 and 530 may be communicated on one RF control channel, while the local control subslots 521, 522, 523, 541, 542, and 543 may be communicated on another RF control channel. As will be described later, it is desired to include the local control channel subslots on a single RF control channel. The central control slots 510 and 530 and the local control sub slots 521-523, and 541-543 each comprise inbound and outbound control time slot and/or subslots on corresponding receive and transmit frequencies, respectively.

Referring to FIG. 5c, the configuration of an outbound central control time slot 516 and an outbound local control subslot 518 are shown. The numbers shown in each slot designate the number of bits allocated to each division time slot or subslots. Each central control time slot 516 can transmit six outbound signalling words (OSWs) 526 and each local control subslots can transmit two OSWs 527. The outbound control slots 516 and 518 include R/T slots for permitting transition from receive to transmit mode as well as providing interslot guard time to avoid interference between adjacent time slots. FS time slots provide for establishing correct slot and bit timing. SLOT ID in the outbound identifies position of slot in sequence of each frame. SYS ID slot in the outbound central control slot 516 identifies the wide area system operating the control channel. Six SITE IDs in the outbound control channel 516 identify the local site that each corresponding OSW is to be transmitted on. In the local control sub slot 518 the SITE ID identifies the local site operating the local control subslot.

Referring to FIG. 5d, the configuration of an inbound central control slot 517 and an inbound local control slot 519 are shown. Each central control slot can receive six inbound signalling words (ISWs) 529 and each local control slot can receive one ISW 531. The R/T and FS slots of the inbound control slots 517 and 519 achieve the same purpose as that described in association with the outbound control slots 516 and 518.

Figure 6:
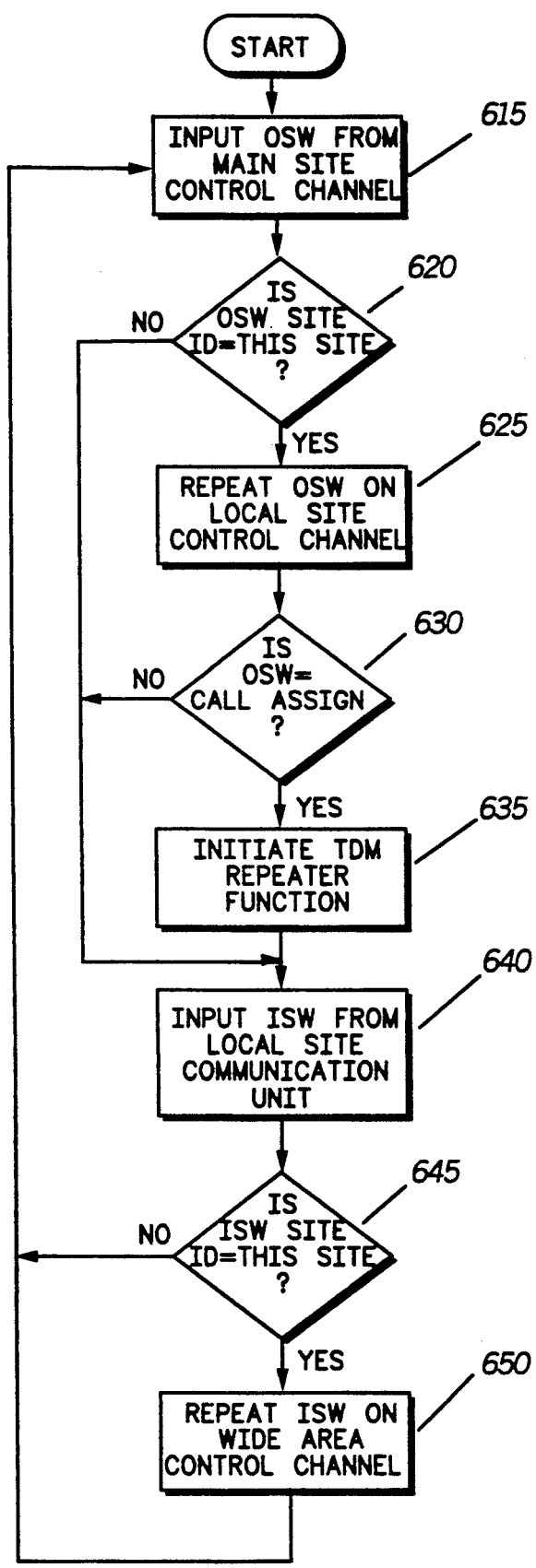
FIG. 6 is an operation diagram of the local site controller of FIG. 3 according to the present invention.

Referring to FIG. 6, the operation of an exemplary local site controller 310 in conjunction with the flow chart 600 is described. The controller begins by receiving an OSW from the main site in block 615. The SITE ID value associated with the OSW is compared to the SITE ID of the local site, block 620. If the SITE IDs are equal, the OSW is repeated in the local site in the assigned local site control channel subslot block 625. Further, if the repeated OSW comprises a call assignment message, block 630, the local site controller proceeds to service the call by initiation of the TDM repeater function, block 635. If the OSW examined in block 620 does not qualify for retransmission, an ISW, if available, is received from a local site communication unit, block 640. In block 645, the SITE ID contained in the received ISW is examined to determine of it is equal to the SITE ID of the local site. If the site IDs are equal, the ISW is repeated in the wide area control channel slot, block 650. If the SITE IDs are not equal, the ISW is discarded and the process resumes at block 615. Following the above steps, only those outbound control messages which apply to the local site are transmitted in the local site control channel subslot and only one local site will retransmit an inbound control message in the wide area control channel time slot.

Figure 5:
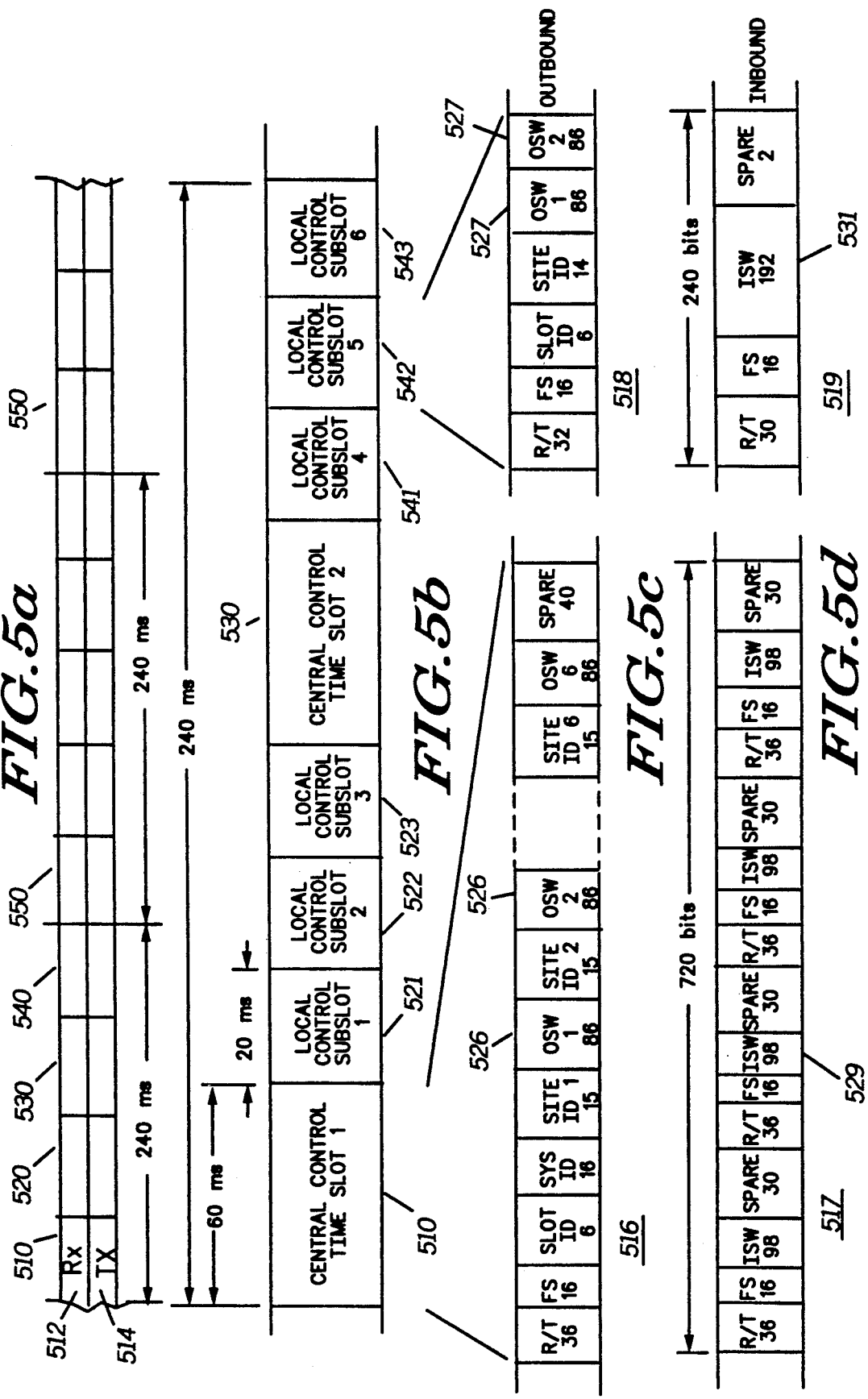
FIGS. 5a-5d show control channel formats of the communication system of FIG. 1 according to the present invention.
Figure 7:
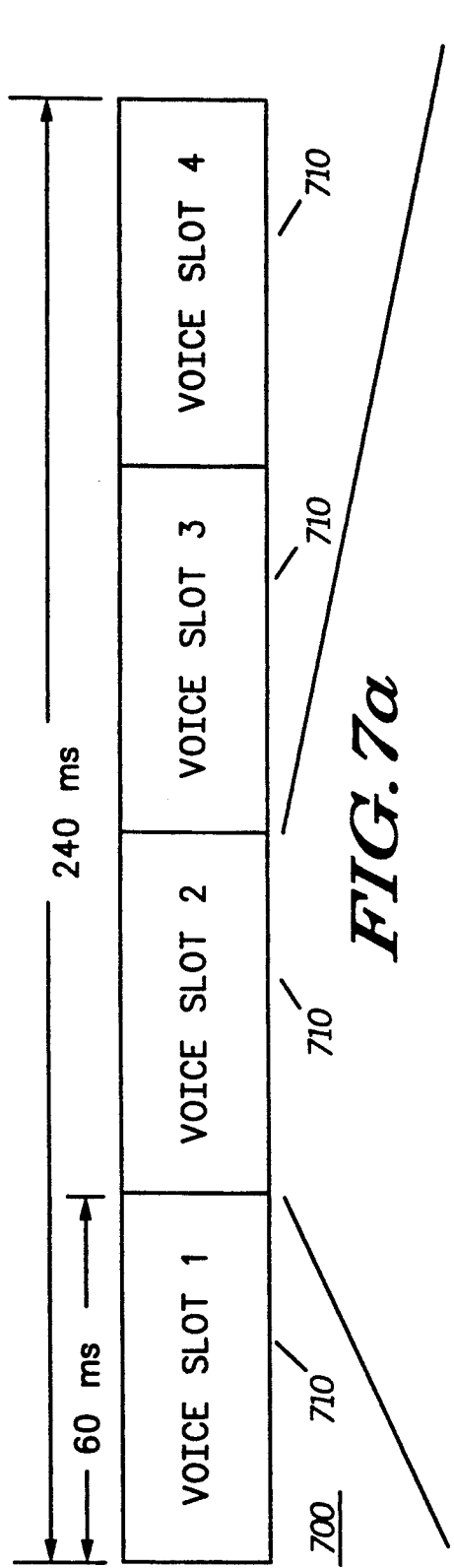
FIGS. 7a-7c show voice channel formats of the communication system of FIG. 1 according to the present invention.

Referring to FIG. 7a, the preferred RF voice channel 700 format for communicating voice messages to the local site communication units 103 and the wide area communication units 104 is shown. The RF voice channel 700 comprises a 4 time slot 710 format (240 msec per frame) similar to the control channel format as shown in FIG. 5. However, depending on the system requirements other time slot arrangements, such as a two slot format, may also be utilized.

Referring to FIG. 7b, the configuration of an outbound voice time slot 720 is shown. The outbound voice time slot 720 includes R/T, FS, and SLOT ID slots which were described in association with FIG. 5. Additionally, the outbound voice time slot 720 includes a supervision data (SUP DATA) and a priority monitor data (PMD) which comprise overhead information. The SUP DATA comprise a security feature for identifying the communication unit or group of communication units authorized to use the slot. As will be described later in the specification, the PMD slot is used to implement an idle communication unit control feature when the control channel vanishes due to a voice call directed to other communication units. The voice messages in the preferred embodiment of the invention comprise digital voice frames which are encoded using the Multi-level Sub-Band coding algorithm (MSBC). The outbound voice time slot 720 includes 8 MSBC voice slots for transmitting the voice messages. A PROP slot accommodates for propagation delay variances due to differing distances of the local sites from the main site station 101 throughout the coverage area.

Referring to FIG. 7c, the message format of an inbound voice time slot 730 is shown. The inbound voice time slot 730 includes R/T slot, FS slot and MSBC voice slots. Additionally, a UID slot is used for unit identification and supervision purposes.

Figure 8:
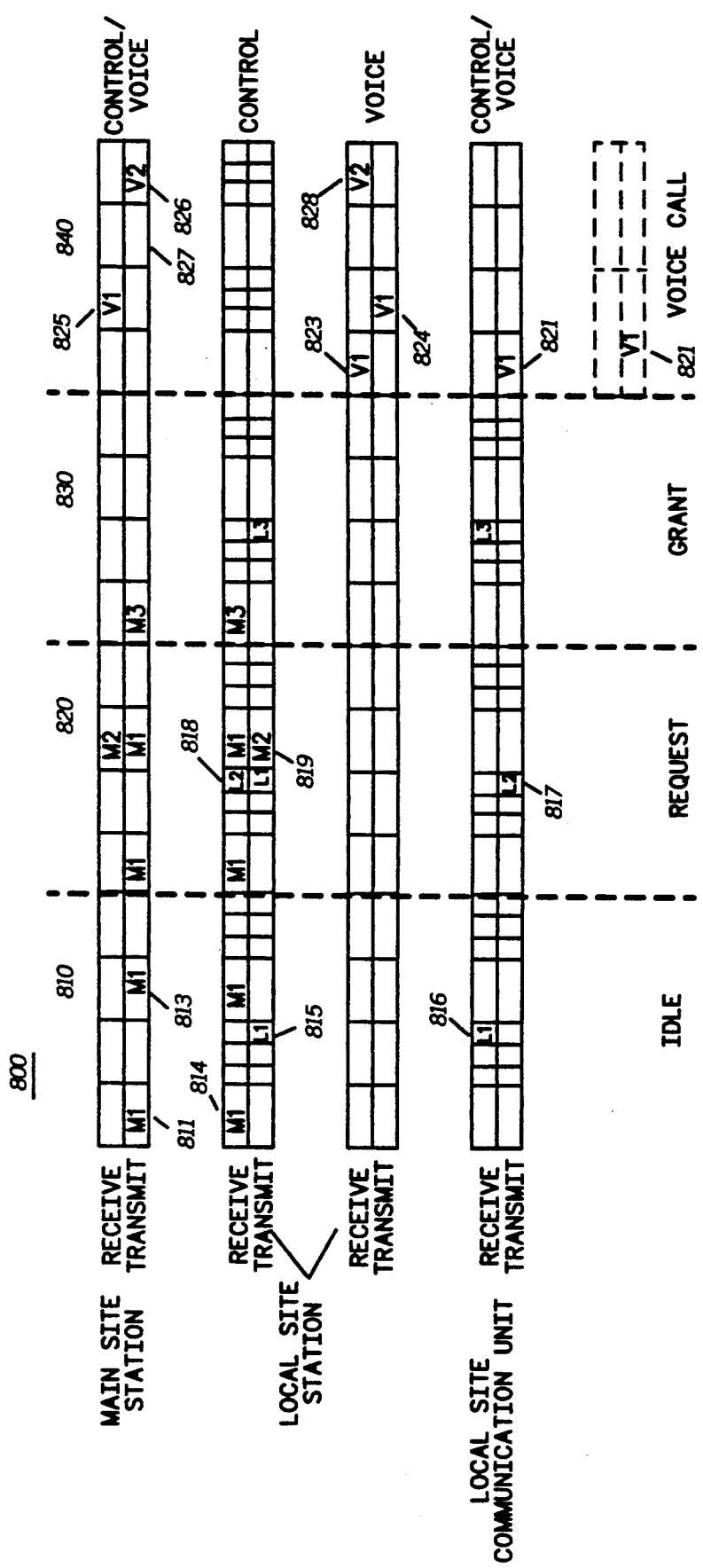
FIG. 8 is an operation diagram of the communication system of FIG. 1.

Referring to FIG. 8, a diagram 800 shows the operational modes of the system 100. The diagram 800 shows four operational modes of the system 100 during frames 810-840. During frame 810, the system is in idle mode, wherein no call is in progress. During frame 820, one of the portable communication units 103 requests a call from the main site station 101. During frame 830, the main site station 101 grants the requested call. During frame 840, a voice call is established between the portable communication unit and a mobile communication unit 104 through the main site station 101. The system 100 as described utilizes four voice time slots per frame and four control time slots per frame. However, the principals of present invention could also be equally applied to other voice and control configurations such as 2-slot voice channels/4-slot control channel or 4-slot voice/6-slot control channels or any other arrangement according to the system requirements.

During the first frame 810, the main site station transmits an idle control message M1 to the local site station 102 during the outbound central control time slot 811 (and 813). The idle control message M1 is configured according to the message format of the outbound central control slot 516 of FIG. 5c which include the SITE ID and the corresponding local site OSW for each site. Each local site station 102 receives the main site control messages M1 during time slot 814 and retrieves the corresponding local site OSW by demultiplexing the relevant portion thereof. The local site station 102 then repeats an outbound local site control message L1 which includes the retrieved OSW during its assigned local control subslot 815. Thus, each local site station 102 only repeats those OSWs that include the appropriate site identifier. All of the portable communication units 103 operating within the local site receive the outbound local site control message L1 during corresponding local control sub slot 816. The outbound local control message L1 is configured according to the message format of the outbound local control subslot 518 of FIG. 5c. The outbound local control message in each local site also contains the SITE ID of the local site station. This allows the portable communication units 103 to respond to only those messages that uniquely identify their current service area.

During frame 820, a call request message L2 is transmitted by a portable communication unit 103 during one of the six inbound local control sub slots 817. The call request message L2 is configured according to the message format of the inbound local control slot 519 of FIG. 5d and includes the SITE ID of the local site in which the portable communication unit is operating. One or more of the local site stations 102 may receive the channel request message L2 during time slot 818, and the site having the corresponding site identifier retransmits the control message M2 to the main site station 101 during the subsequent central control time slot 819. This site identification process guarantees that only one local site station will repeat a given message from the portable units 103, and also inherently provides site identification to the main site station 101. It should be noted that the main site 101 continues to transmit the idle messages during the frame 820, which are received by the remote site station 102. The local site station 102 repeats the idle message to the portable units during the same time slot as that the call request is received from the calling communication unit. Accordingly, the local site station 101 operates in a duplex manner to accommodate for this situation.

After suitable processing, the central sends a grant message M3 to the portable communication unit during the frame 830 using identical message path as that described in conjunction with the idle messages during the frame 810.

After receiving the grant, voice communications begin on the assigned voice channel as shown during the frame 840. As mentioned the communication unit 103 comprises a simplex two-way radio. In order to establish a duplex call, the communication unit 103 transmits a voice message V1 during a transmit voice time slot 821. The transmit voice message V1 is received by the local site station 102 on its voice channel during time slot 823 and repeated during the subsequent time slot 824. In the preferred embodiment of the invention the voice messages assigned to the same RF communication channel as the main site control slots are communicated to the main site in time slots during which the control messages are not communicated. This scheme allows utilizing a single RF communication channel for communicating both voice and control messages with the main site station 101. The voice message V1 is received by the main site station during time slot 825 and an outbound voice message V2 is transmitted from the main site station during subsequent voice time slot 826 which follows a central control time slot 827. The voice message V2 may also be communicated from the main site station 101 to a wide area site communication unit 104 operating in the wide area site W. The outbound voice message is received by the local site station 102 during time slot 828 and retransmitted to the portable communication unit 103. The portable communication unit receives the repeated voice message V2 during a transmit voice time slot in a frame subsequent to frame 840 (not shown). This pattern of voice message communication is repeated in each subsequent frame for the duration of the voice call.

In some voice channel format implementations, the control channel of the local site station 101 may be unavailable to the portable communication units 103 while a voice call is in progress if the RF channel assigned to the voice call is the same channel used for local site control subslot communications. This is generally the case if the portable units use two slot TDM, where the inbound and outbound voice messages occupy two time slots (shown in the dotted line). As can be seen in FIG. 8 a duplex call using a four-slot TDM portable also requires partial deactivation of the local site station control channel to transmit the outbound voice message V1 to the main site station 101. When the control channel is not available, a method of servicing idle local site communication units not involved in the voice call will be describe later.

Figure 9:
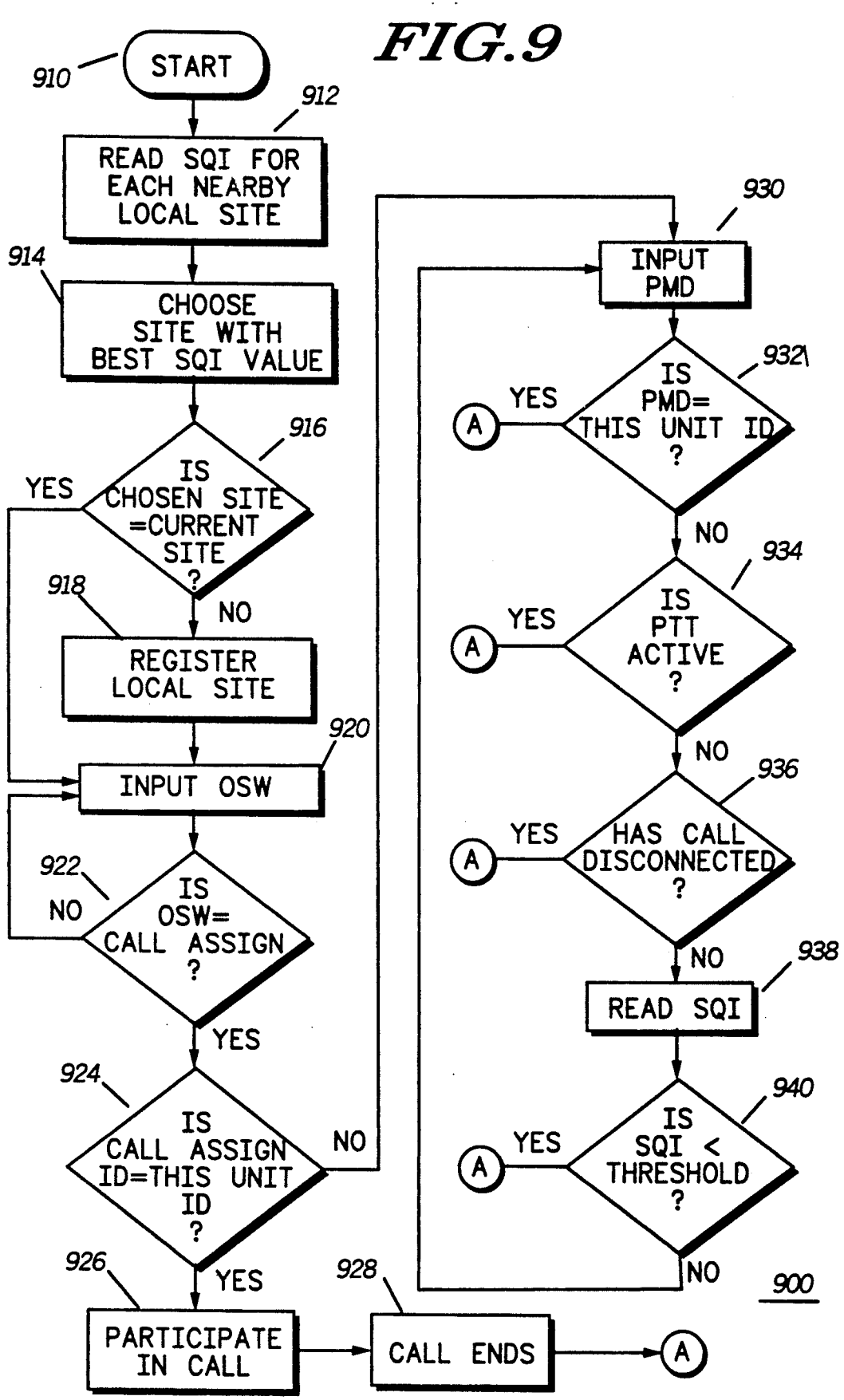
FIG. 9 is an operation flow chart of the local site communication unit of FIG. 4 according to the present invention.

Referring to FIG. 9, the operation of an exemplary local site communication unit 103 in conjunction with the flow chart 900 is described. When the communication unit 103 is turned on, block 910, it finds a local site control channel by scanning the six possible control subslots and measuring the signal quality indicator (SQI) from each local site, block 912. The hardware of the portable communication unit 103 may be greatly simplified by receiving inbound control messages on a single RF channel, as the need to change the RF frequency for each local site is eliminated. The local site having the greatest or best average signal strength will be chosen, block 914. It may be appreciated that other communication quality characteristics, such as signal to noise ratio, may be measured by the communication unit 103 for selecting a local site. Accordingly, the local site having a signal quality strength greater than a threshold value is selected. An enhancement of this algorithm would cause the portable to re-scan on a periodic basis if no control channel with signal strength above a certain threshold is found. When a control channel and thus, a local site is chosen the portable communication unit 103 transmits a registration ISW to notify the main site station 101 of its current operating site, block 918. Subsequently, as the portable communication unit 103 moves about the system 100, the portable must re-scan and re-register each time its control channel signal strength falls below the threshold level. It should be noted that since all local control channels share the same frequency during different time slots, a communication unit can sense its own movement by continuously monitoring the signal strengths of all other control channels in its area. Thus, the portable communication unit 103 could switch local sites and re-register when a sufficiently strong channel is found, even if its current channel is still above threshold.

Once the communication unit 103 registers its operating local site it inputs outbound communication messages from the correspond local site station 102, block 920. Determination is made as to whether the outbound message comprises a call assign message directed to the ID of the communication unit 103, blocks 922 and 924. If the call is directed to the portable communication unit 103, it participates in the call, block 926. After the call is terminated, block 928, the communication unit 103 resumes to search for a local site by reading signal quality strength of the local sites, block 912.

As noted previously, a voice call may result in the temporary absence of a control channel in the local site where the call is in progress. The absence of a control channel may cause the idle portable communication units 103 which do not participate in the voice call to miss a voice call directed to them or to become unable to place a call themselves. Under these circumstances, the idle communication units 103 monitor the overhead slots of the outbound voice messages. As described in conjunction with FIG. 6c, the over head data includes a PMD slot. The PMD includes information for alerting the idle communication units of a call directed to them. The communication units therefore determine whether the PMD includes their unit ID, block 932. If the unit ID of an idle communication unit 103 is detected in the PMD, it selects and registers with a free local site which provides the best signal quality strength. The registration of the communication unit with the free local site will cause the main site to direct the voice call for the idle communication unit to the newly selected local site. If the PMD does not contain the unit ID of the portable communication unit 103, the PTT button activation is detected in order to determine whether the communication unit desires to initiate a voice call, block 934. If a PTT activation is detected, the communication unit selects a free local site as described. If the PTT button is inactive, determination is made as to whether the call in progress has terminated, block 938. If so, the communication unit returns to block 912 to select a new site if necessary and registers in it. If the voice call is still in progress the communication unit remains in the current site as long as the signal quality strength is above the threshold level. Otherwise, the communication unit selects and registers to a new local site.

Accordingly, the communication system 100 provides communication capability among the mobile and portable communication units 103 and 104 operating in the wide area W and plurality of local sites L1-L6. The division of the control RF channel(s) into central control time slots and the local control subslots provides an efficient method for providing communication capability for a wide area site and a plurality of local sites. The principals of the present invention effectively provide for efficient geographical reuse of RF channels for providing services for a geographical area. It may be appreciated that many variations of the communication system of the present invention may be available.

What is claimed is:

1. A communication system capable of communicating communication messages within a wide area site and a plurality of local sites, wherein coverage area of said local sites are substantially smaller and contained within coverage area of said wide area site, using at least one radio frequency channel divided into at least one time slot and a plurality of subslots, said subslots having substantially shorter duration than said time slot, and wherein each of said subslots is assigned to a local site, comprising:
a plurality of local site communication units operating within the coverage area of said local sites;
a plurality of wide area communication units operating within the coverage are of the wide area site;
a plurality of local site communication means for communicating communication messages with at least one local site communication unit during said subslots;
a main site communication means for communicating communication messages with said local site communication means and said wide area communication unit during at least one of said time slots.

2. The communication system of claim 1, wherein said local site communication units include means for selecting a local site which provides a communication quality characteristic above a threshold level during its assigned subslot.

3. The communication system of claim 1 further including means for communicating messages between the local site communication units and the wide area site communication units.

4. The communication system of claim 3, wherein said local site communication units include means for selecting another local site when said local site communication unit does not participate in a call in progress.

5. The communication system of claim 4 further including means for informing local site communication units not participating in a call in progress of a call directed to them.

6. The communication system of claim 1, wherein said local site communication unit comprises a substantially low power two-way portable radio and said wide area site communication unit comprises a substantially high power mobile two-way radio.

7. The communication system of claim 1, wherein said local site communication means comprise a plurality of local repeaters and a local site controller.

8. The communication system of claim 1, wherein at least one of said time slots may be assigned by the main site communication means for communicating communication messages within the wide-area site.

9. The communication system of claim 8, wherein at least one of said time slots may be assigned by the main site communication means for communicating communication messages within at least one of the said local sites.

10. A method for communicating communication messages between local site communication units operating in a plurality of local sites and a main site communication means within a wide area site via at least one radio frequency channel divided into at least one time slot and a plurality of subslots, wherein said subslots have a substantially shorter duration than said time slot, comprising the steps of:
(a) assigning each of said subslots for communication of messages with a corresponding local site and assigning said time slot for communication of messages with the main site;
(b) communicating communication messages between said main site communication means and a plurality of local site communication means during said time slots;
(c) communicating communication messages between each local site communication means and at least one communication unit during said subslots; and
(d) communicating communication messages between said main site communication means and a plurality of main site communication units during said time slots.

11. The method of claim 10 further comprising the steps of:
(e) establishing calls between the local site communication units and the main site communication units;
(f) informing local site communication units not participating in a call in progress of another call directed to them.

12. In a communication system capable of communicating communication messages within a wide area site and a plurality of local sites, wherein coverage area of said local sites are substantially smaller and contained within coverage area of said wide area site, using at least one radio frequency channel divided into at least one time slot and a plurality of subslots, said subslots having substantially shorter duration than said time slot, and wherein each local site includes a local site communication means for communicating messages during one of said subslots assigned to that local site, and wherein said wide area site includes a main site communication means for communicating communication messages with said local site communication means and a plurality of wide area coverage communication units during said time slot, a communication unit operating within the coverage area of said local site comprising:

means for communicating with the local site communication means during its assigned subslots;

means for measuring a communication quality characteristic during subslots assigned to each local site;

means for selecting a local site which during its assigned subslot provides a communication quality characteristic above a threshold level.

13. A method for providing communication capability between a wide area site and a plurality of local sites, wherein coverage area of said local sites are substantially smaller and contained within coverage area of said wide area site, comprising the steps of:

(a) dividing at least one radio frequency channel into at least one time slot and a plurality of subslots, wherein each of said subslots have substantially shorter duration than said time slot;

(b) assigning said time slot for communicating communication messages between said local site and said wide area site;

(c) assigning at least one of said subslots to each of said local sites for communicating communication messages within that local site.

* * * * *